(12) United States Patent
Peters et al.

(10) Patent No.: US 11,198,192 B2
(45) Date of Patent: Dec. 14, 2021

(54) WELDING OR ADDITIVE MANUFACTURING DUAL WIRE DRIVE SYSTEM

(71) Applicant: Lincoln Global, Inc., Santa Fe Springs, CA (US)

(72) Inventors: Steven R. Peters, Huntsburg, OH (US); Alexander C. Mehlman, Strongsville, OH (US); Matthew A. Weeks, Walloon (AU); Bradford W. Petot, South Euclid, OH (US)

(73) Assignee: LINCOLN GLOBAL, INC., Santa Fe Springs, CA (US)

( * ) Notice: Subject to any disclaimer, the term of this patent is extended or adjusted under 35 U.S.C. 154(b) by 310 days.

(21) Appl. No.: 16/159,805

(22) Filed: Oct. 15, 2018

(65) Prior Publication Data
US 2020/0114452 A1 Apr. 16, 2020

(51) Int. Cl.
*B23K 9/133* (2006.01)
*B23K 9/04* (2006.01)
(Continued)

(52) U.S. Cl.
CPC ............ *B23K 9/1336* (2013.01); *B23K 9/042* (2013.01); *B23K 9/1333* (2013.01); *B33Y 10/00* (2014.12);
(Continued)

(58) Field of Classification Search
CPC ........ B23K 9/1336; B23K 9/04; B23K 9/042; B23K 9/1333; B23K 35/0266;
(Continued)

(56) References Cited

U.S. PATENT DOCUMENTS 3,167,636 A 1/1965 Bosteels
3,694,620 A 9/1972 Gleason
(Continued)

FOREIGN PATENT DOCUMENTS

CN 204339099 U 5/2015
DE 44 20 706 A1 12/1995
(Continued)

OTHER PUBLICATIONS

Extended European Search Report from Corresponding Application No. 19203369.4; dated Jul. 31, 2020; pp. 1-8.
(Continued)

*Primary Examiner* — Justin C Dodson
*Assistant Examiner* — Dilnessa B Belay
(74) *Attorney, Agent, or Firm* — Brad C. Spencer

(57) ABSTRACT

A welding or additive manufacturing wire drive system includes a first drive roll having a first annular groove, a second drive roll having a second annular groove, a first welding wire located between the drive rolls in the annular grooves, and a second welding wire located between the drive rolls in the annular grooves. A biasing member biases the first drive roll toward the second drive roll to force the first welding wire to contact the second welding wire. The first welding wire contacts each of a first sidewall portion of the first annular groove, a first sidewall portion of the second annular groove, and the second welding wire. The second welding wire contacts each of a second sidewall portion of the first annular groove, a second sidewall portion of the second annular groove, and the first welding wire. The drive rolls rotate in opposite directions thereby moving the welding wires through the wire drive system.

26 Claims, 6 Drawing Sheets

(51) Int. Cl.
    *B33Y 70/00*       (2020.01)
    *B33Y 30/00*       (2015.01)
    *B33Y 40/00*       (2020.01)
    *B33Y 10/00*       (2015.01)

(52) U.S. Cl.
    CPC ............... *B33Y 30/00* (2014.12); *B33Y 40/00* (2014.12); *B33Y 70/00* (2014.12)

(58) Field of Classification Search
    CPC ...... B23K 35/0283; B23K 9/02; B23K 9/125; B23K 9/164; B23K 9/1735; B23K 9/287; B23K 9/325; B33Y 10/00; B33Y 30/00
    USPC ...................................................... 219/76.14
    See application file for complete search history.

(56) References Cited

U.S. PATENT DOCUMENTS

| | | | |
|---|---|---|---|
| 5,816,466 | A | 10/1998 | Seufer |
| 6,066,833 | A | 5/2000 | Rigdon et al. |
| 6,374,655 | B1 * | 4/2002 | Hresc .................. B21F 3/02 72/129 |
| 8,278,599 | B2 | 10/2012 | Patterson |
| 8,569,653 | B2 | 10/2013 | Enyedy |
| 9,517,524 | B2 | 12/2016 | Miller |
| 9,839,970 | B2 | 12/2017 | Peters et al. |
| 10,010,962 | B1 | 7/2018 | Gelmetti et al. |
| 2001/0008235 | A1 * | 7/2001 | Miszczak .......... B23K 35/0261 219/146.1 |
| 2008/0156783 | A1 | 7/2008 | Vanden Heuvel et al. |
| 2010/0314373 | A1 * | 12/2010 | Patterson ............... B65H 51/14 219/136 |
| 2011/0309062 | A1 | 12/2011 | O'Donnell et al. |
| 2012/0152921 | A1 * | 6/2012 | Peters .................. B23K 9/1735 219/130.1 |
| 2013/0292366 | A1 | 11/2013 | Enyedy et al. |
| 2013/0334188 | A1 | 12/2013 | Enyedy et al. |
| 2015/0209905 | A1 | 7/2015 | Matthews et al. |

FOREIGN PATENT DOCUMENTS

| | | |
|---|---|---|
| DE | 196 11 597 A1 | 9/1997 |
| JP | S51-44542 A | 4/1976 |
| JP | H02-258168 A | 10/1990 |
| JP | H05-111769 A | 5/1993 |
| JP | H10-58142 A | 3/1998 |
| JP | H10-113771 A | 5/1998 |
| JP | 3739870 B2 | 1/2006 |
| KR | 200455348 Y1 | 8/2011 |
| WO | 2012/153177 A1 | 11/2012 |

OTHER PUBLICATIONS

Extended European Search Report from Corresponding Application No. EP19203389.2; dated Jun. 22, 2020; pp. 1-9.
Shi, et al.; "Physical Characteristics of Twin-Wire Indirect Arc Plasma;" Vacuum; vol. 107; dated Apr. 3, 2014; pp. 41-50.
Extended European Search Report from Corresponding Application No. 19205296.7; dated Aug. 13, 2020; pp. 1-13.
Extended European Search Report from Corresponding Application No. 19205356.9; dated Aug. 13, 2020; pp. 1-9.
Kemppi; "ArcFeed 200, 300, 300P, 300RC Operating Manual"; https://resources.userdoc.kemppi.com/manuals/kemppi-arcfeed-om-en.pdf; Accessed Jul. 5, 2018; pp. 1-20.
Castolin Eutectic; "CastoMIG 350C and DS"; https://ecitydoc.com/download/strangerwith-castolin-eutectic-welding-equipment-catalogue_pdf; Dated Jan. 29, 2018; pp. 1-52.
Misumi; "Guide Roller (V Type, Single Bearing) (GRL-SH1-V)"; https://my.misumi-ec.com/vona2/detail/221000383638/?CategorySpec=00000196577%3a%3ad; Accessed Jul. 5, 2018; pp. 1-5.
EWM AG; "MIG/MAG Primer"; Dated Nov. 2015; p. 94.

\* cited by examiner

WELDING OR ADDITIVE MANUFACTURING DUAL WIRE DRIVE SYSTEM

BACKGROUND OF THE INVENTION

Field of the Invention

Devices, systems, and methods consistent with the invention relate to material deposition with a dual wire configuration.

Description of Related Art

When welding, it is often desirable to increase the width of the weld bead or increase the length of the weld puddle during welding. There can be many different reasons for this desire, which are well known in the welding industry. For example, it may be desirable to elongate the weld puddle to keep the weld and filler metals molten for a longer period of time so as to reduce porosity. That is, if the weld puddle is molten for a longer period of time there is more time for harmful gases to escape the weld bead before the bead solidifies. Further, it may desirable to increase the width of a weld bead so as to cover wider weld gap or to increase a wire deposition rate. In both cases, it is common to use an increased electrode diameter. The increased diameter will result in both an elongated and widened weld puddle, even though it may be only desired to increase the width or the length of the weld puddle, but not both. However, this is not without its disadvantages. Specifically, because a larger electrode is employed more energy is needed in the welding arc to facilitate proper welding. This increase in energy causes an increase in heat input into the weld and will result in the use of more energy in the welding operation, because of the larger diameter of the electrode used. Further, it may create a weld bead profile or cross-section that is not ideal for certain mechanical applications. Rather than increasing the diameter of the electrode, it may be desirable to use two smaller electrodes simultaneously.

BRIEF SUMMARY OF THE INVENTION

The following summary presents a simplified summary in order to provide a basic understanding of some aspects of the devices, systems and/or methods discussed herein. This summary is not an extensive overview of the devices, systems and/or methods discussed herein. It is not intended to identify critical elements or to delineate the scope of such devices, systems and/or methods. Its sole purpose is to present some concepts in a simplified form as a prelude to the more detailed description that is presented later.

In accordance with one aspect of the present invention, provided is a welding or additive manufacturing wire drive system. The system includes a first drive roll having a first annular groove, and a second drive roll having a second annular groove aligned with the first annular groove. A first welding wire is located between the first drive roll and the second drive roll in both of the first annular groove and the second annular groove. A second welding wire is located between the first drive roll and the second drive roll in both of the first annular groove and the second annular groove. A biasing member biases the first drive roll toward the second drive roll to force the first welding wire to contact the second welding wire. The first welding wire contacts each of a first sidewall portion of the first annular groove, a first sidewall portion of the second annular groove, and the second welding wire. The second welding wire contacts each of a second sidewall portion of the first annular groove, a second sidewall portion of the second annular groove, and the first welding wire. The first drive roll and the second drive roll rotate in opposite directions thereby moving the first welding wire and the second welding wire through the welding wire drive system.

In accordance with another aspect of the present invention, provided is a welding or additive manufacturing wire drive system. The system includes a first drive roll having a first circumferential groove comprising a first groove base extending between a first inner sidewall and a first outer sidewall of the first circumferential groove. The system further includes a second drive roll having a second circumferential groove aligned with the first circumferential groove. The second circumferential groove comprises a second groove base extending between a second inner sidewall and a second outer sidewall of the second circumferential groove. A first welding wire is located between the first drive roll and the second drive roll in both of the first circumferential groove and the second circumferential groove, and a second welding wire is located between the first drive roll and the second drive roll in both of the first circumferential groove and the second circumferential groove. A biasing member biases the first drive roll toward the second drive roll to force the first welding wire to contact the second welding wire. The first welding wire contacts each of the first inner sidewall, the second inner sidewall, and the second welding wire, and the second welding wire contacts each of the first outer sidewall, the second outer sidewall, and the first welding wire. At least one of the first welding wire and the second welding wire is offset from both of the first groove base and the second groove base.

In accordance with another aspect of the present invention, provided is a welding or additive manufacturing wire drive system. The system includes a first drive roll and a second drive roll. One or both of the first drive roll and the second drive roll has a circumferential groove. A first welding wire is located between the first drive roll and the second drive roll in the circumferential groove. A second welding wire is located between the first drive roll and the second drive roll in the circumferential groove. A biasing member biases the first drive roll toward the second drive roll to force the first welding wire to contact the second welding wire. The first welding wire further contacts a first sidewall portion of the circumferential groove, and the second welding wire further contacts a second sidewall portion of the circumferential groove, and both of the first welding wire and the second welding wire are offset from a base portion of the circumferential groove. The base portion extends between the first sidewall portion and the second sidewall portion of the circumferential groove.

BRIEF DESCRIPTION OF THE DRAWINGS

The foregoing and other aspects of the invention will become apparent to those skilled in the art to which the invention relates upon reading the following description with reference to the accompanying drawings, in which.

DETAILED DESCRIPTION OF THE INVENTION

Figure 1:
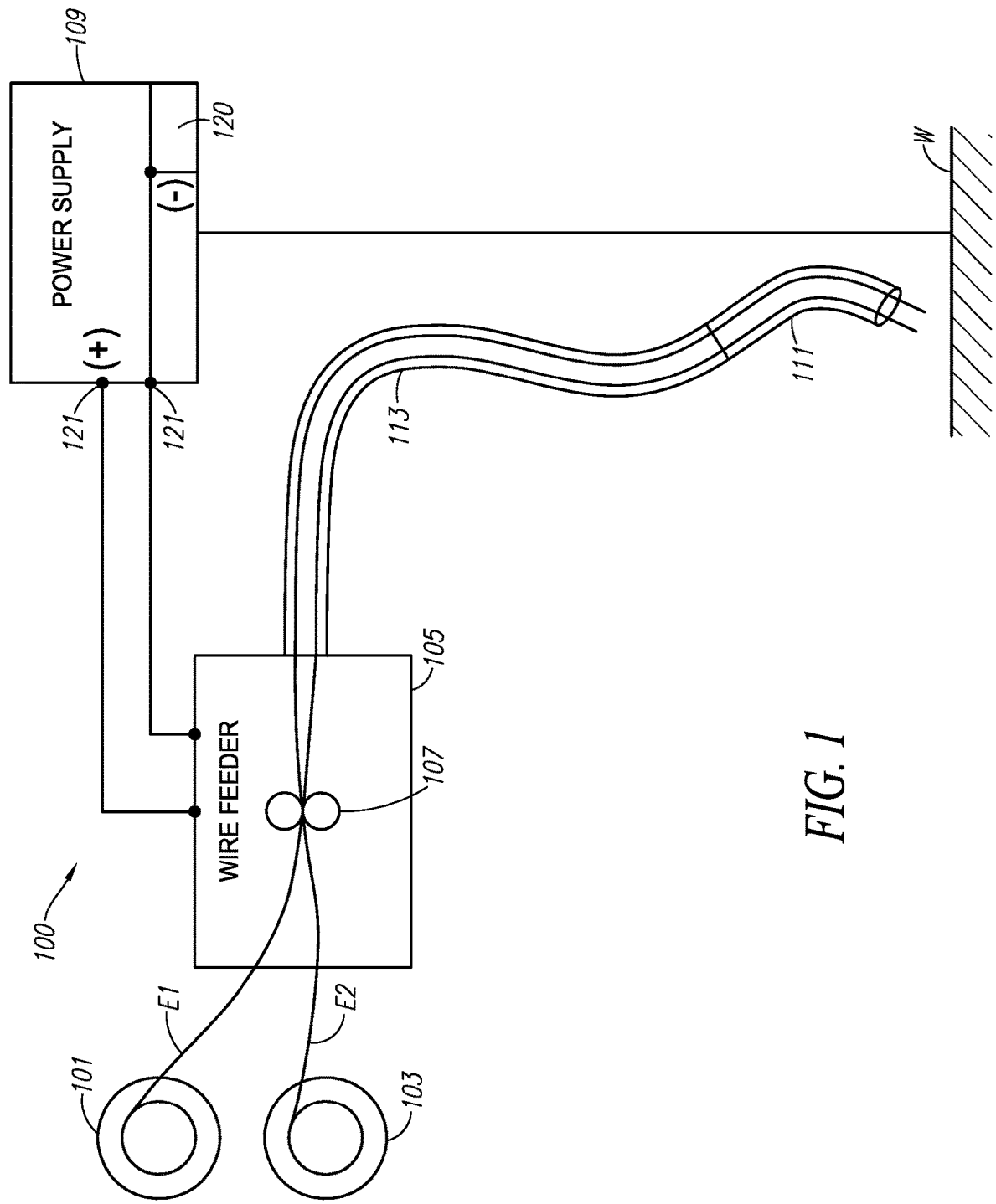
FIG. 1 is a schematic diagram of an example welding system.

Exemplary embodiments of the invention will now be described below by reference to the attached Figures. The described exemplary embodiments are intended to assist the understanding of the invention, and are not intended to limit the scope of the invention in any way. Like reference numerals refer to like elements throughout.

Embodiments of the present invention are described herein in the context of a welding system. Example welding systems include gas metal arc welding (GMAW) systems, submerged arc welding (SAW) systems, flux-cored arc welding (FCAW) systems, metal-cored arc welding (MCAW) systems, and the like. Further, while the electrodes described herein can be solid electrodes, embodiments of the present invention are not limited to the use of solid electrodes. For example, flux-cored electrodes and metal-cored electrodes can also be used without departing from the spirit or scope of the present invention. Further, embodiments of the present invention can also be used in manual, semi-automatic and robotic welding operations. Because such systems are well known, they will not be described in detail herein.

Embodiments of the present invention will be discussed in the context of a welding system. However, in addition to welding operations, embodiments can be used in additive manufacturing processes and other welding-type processes involving driven wire electrodes (e.g., hardfacing).

Turning now to the Figures, FIG. 1 depicts an exemplary embodiment of a welding system 100. The welding system 100 contains a welding power source or power supply 109 which is coupled to both a welding torch 111 and a wire feeder 105. The power source 109 can be any known type of welding power source capable of delivering welding current and welding waveforms, for example, pulse spray, STT and/or short arc type welding waveforms. Because the construction, design and operation of such power supplies are well known, they need not be described in detail herein. It is also noted that welding power can be supplied by more than one power supply at the same time—again the operation of such systems are known. The power source 109 can also include a controller 120 which is coupled to a user interface to allow a user to input control or welding parameters for the welding operation. The controller 120 can have a processor, CPU, memory etc. to be used to control the operation of the welding process and the generation of welding waveforms. The torch 111, which can be constructed similar to known manual, semi-automatic or robotic welding torches and can be of a straight or gooseneck type. The wire feeder 105 draws wire electrodes E1 and E2 from electrode sources 101 and 103, respectively, which can be of any known type, such as reels, spools, containers or the like. The wire feeder 105 employs drive rolls 107 to draw the electrodes or welding wires E1 and E2 and push or pull the electrodes to the torch 111. Details of the drive rolls 107 are discussed further below. The drive rolls 107 and wire feeder 105 are configured for a dual electrode welding operation. That is, they supply both electrodes E1 and E2 simultaneously to the torch 111 for creating an arc and welding the workpiece W. As shown, the wire feeder 105 is operatively connected to the power source 109 consistent with known configurations of welding operations.

Once driven by the drive rolls 107, the electrodes E1 and E2 can be passed through a liner 113 to deliver the electrodes E1 and E2 to the torch 111. The liner 113 is appropriately sized to allow for the passage of the electrodes E1 and E2 to the torch 111. For example, for two 0.030 inch diameter electrodes, a standard 0.0625 inch diameter liner 113 (which is typically used for a single 0.0625 inch diameter electrode) can be used with no modification.

In certain embodiment, the wire electrodes E1, E2 can have different diameters. That is, embodiments of the present invention can use an electrode of a first, larger, diameter and an electrode of a second, smaller, diameter. In such an embodiment, it may be possible to more conveniently weld two workpieces of different thicknesses. For example, the larger electrode can be oriented to the larger workpiece while the smaller electrode can be oriented to the smaller workpiece. Further, embodiments of the present invention can be used for many different types of welding operations including, but not limited to, GMAW, SAW, FCAW, and MCAW. Additionally, embodiments of the present invention can be utilized with different electrode types. For example, it is contemplated that a cored electrode (e.g., flux-cored or metal-cored) can be coupled with a non-cored or solid electrode. Further, electrodes of differing compositions can be used to achieve desired weld properties and composition of the final weld bead. Two different, but compatible, consumables can be combined to create a desired weld joint. For example, compatible consumables such as hardfacing wires, stainless wires, nickel alloys and steel wires of different composition can be combined. As one specific example a mild steel wire can be combined with an over-alloyed wire to make a 309 stainless steel composition. This can be advantageous when a single consumable of the type desired does not have desirable weld properties. For example, some consumables for specialized welding provide the desired weld chemistry but are extremely difficult to use and have difficulty providing a satisfactory weld. However, embodiments of the present invention allow for the use of two consumables that are easier to weld with to be combined to create the desired weld chemistry. Embodiments of the present invention can be used to create an alloy/deposit chemistry that is not otherwise commercially available, or otherwise very expensive to manufacture. Thus, two different consumables can be used to obviate the need for an expensive or unavailable consumable. Further, embodiments can be used to create a diluted alloy. For example, a first welding wire could be a common, inexpensive alloy and a second welding wire could be a specialty wire. The resulting deposit would be the average of the two wires, mixed well in the formation of a molten droplet, at the lower average cost of the two wires, over an expensive specialty wire. Further, in some applications, the desired deposit could be unavailable due to the lack of appropriate consumable chemistry, but could be achieved by mixing two standard alloy wires, mixed within the molten droplet and deposited as a single droplet. Further, in some applications, such as the application of wear resistance metals, the desired deposit may be combination of tungsten carbide particles from one wire and chrome carbide particles from another. Still in another application, a larger wire housing larger particles within is mixed with a smaller wire containing fewer particles or smaller particles, to deposit a mixture of the two wires. Here the expected contribution from each of the wires is proportional to the size of wire. Further, although exemplary embodiments are discussed herein utilizing two wire electrodes simultaneously, other embodiments of the present invention can utilize more than two electrodes. For example, it is contemplated that a three or more electrode configuration can be utilized consistent with the descriptions and discussions set forth herein.

Figure 2:
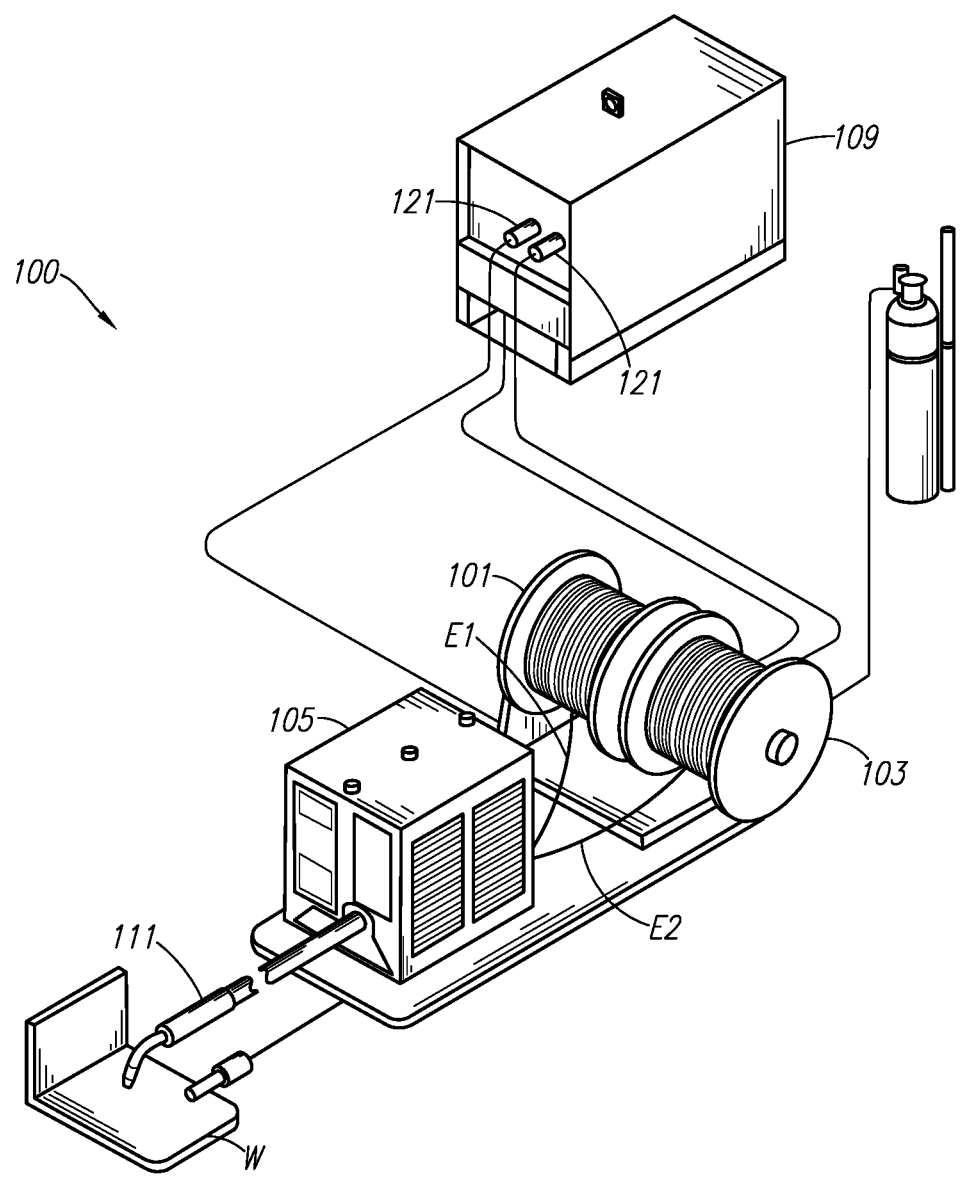
FIG. 2 is a perspective view of an example welding system.

FIG. 2 provides a perspective view of the welding system 100. The wire feeder 105 comprises drive rolls for conveying wire electrodes E1, E2 from electrode sources 101, 103, for use in a particular application. The wire electrodes E1, E2, may be drawn continuously from a reel, spool, or container (e.g., a box or a drum), and delivered to the workpiece W, which in the current embodiment is a weldment. The wire feeder 105 may include a drive assembly that utilizes power from one or more locomotive devices, such as an electric motor, that drive the wire electrodes E1, E2 to the application work site or workpiece W.

The welding power source 109 may receive electrical input power from an outside source (e.g., utility power), that is directed to an onboard transformer and processor-controlled inverter or chopper circuitry, not depicted in the figures. Output from the power source 109 may be provided through welding output terminals 121 or studs of the welding power source. A welding gun or torch 111 and wire conduit may be electrically connected to the welding power source 109 through the welding wire feeder 105 for delivering welding current to the workpiece W in a manner known in the art. It follows that the welding wires E1, E1 are fed through the torch 111 and metered out, i.e. dispensed, at the discretion of the application and/or end user in any manner suitable for conducting the welding process. It is noted that the electrodes E1, E1 conduct electricity for establishing a welding arc, wherein the electrodes are conveyed to the workpiece W having a voltage potential equal to or approximately equal to the output voltage of the welding power source 109, which may be substantially greater than ground.

Different modes of conveying the wire electrodes E1, E2 are known in the art, an example of which includes pushing the electrodes to the torch 111 via power or torque provided by the locomotive device. Other modes of conveying the electrodes include push/pull modes that utilize multiple locomotive devices. The electrodes E1, E2 are delivered to the torch 111, which may have a trigger or other activation mechanism for dispensing the electrodes at the user's discretion. At times, it may be necessary to deliver the electrodes E1, E2 at varying rates of feed. Therefore, the locomotive device has an output that is adjustable for varying the wire feed speed (WFS) of the electrodes E1, E2. In particular, a drive motor of the wire feeder 105 may be a variable speed motor to adjust the WFS.

Figure 3:
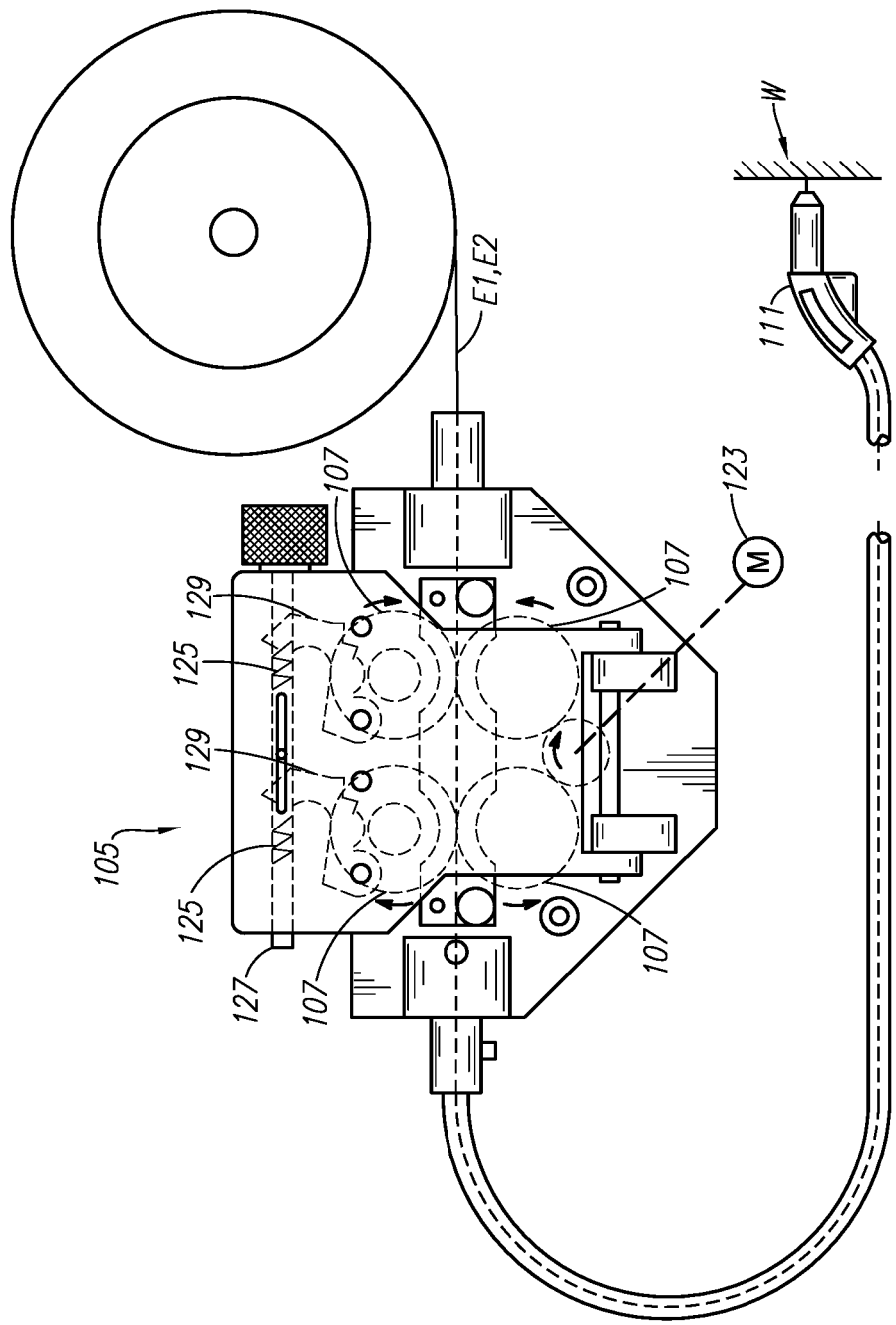
FIG. 3 is a side view of an example wire feeder.

A drive motor 123 is shown in FIG. 3. The wire feeder 105 and/or drive motor(s) 123 may draw operating power from the welding power source 109, or an altogether separate power source. Still any manner of providing power to operate the welding wire feeder 105 and/or the drive motors 123 may be chosen with sound engineering judgment as is appropriate for use with the embodiments of the present invention.

Referring to FIGS. 2 and 3, the welding wire feeder 105 may include a drive assembly, or drive roll assembly. As mentioned above, the drive motor 123, also called a wire feeder motor, delivers power, i.e. torque, to convey the first and second welding wires E1, E2 through the wire feeder and to the torch 111 and subsequently to the workpiece W. Drive rolls 107 are included that grip the welding wires E1, E2 for pushing or pulling the welding wires in the appropriate direction, i.e. toward the workpiece W. Sets of drive rolls 107 are vertically aligned and have corresponding aligned annular or circumferential grooves through which the wending wires E1, E2 pass simultaneously. It can be seen that the vertically-aligned sets of drive rolls 107 rotate in opposite directions to drive the welding wires E1, E2 through the wire feeder 105. For example, in FIG. 3, the upper drive rolls 107 rotate clockwise and the lower drive rolls rotate counterclockwise. The drive rolls 107 may be cylindrical in configuration, or more specifically disk-shaped, although the particular configuration should not be construed as limiting. The surface, i.e. the outer circumference, of the driver rolls 107 may be comprised of a sufficiently hardened material, like steel, that is durable and suitable for gripping the welding wires E1, E2. As shown, the drive rolls 107 may be disposed in pairs along the wire trajectory with each drive roll of the pair being supported on opposing sides of the welding wires E1, E2, such that respective outer circumferential portions of the rolls engage opposite sides of the wires (e.g., from above and below). It is noted that the central axes of respective drive rolls 107 extend substantially parallel with one another and generally transverse to the trajectory of the welding wires E1, E1.

The wire feeder 105 can include a biasing member that biases the vertically-aligned sets of drive rolls 107 toward one another. The biasing member sets the clamping force or compression that the drive rolls 107 apply to the welding wires E1, E2. For example, the wire feeder 105 can include biasing springs 125 that apply a bias force to one or more drive rolls 107 to set the compression that the drive rolls apply to the welding wires E1, E2. In the example embodiment of FIG. 3, the biasing springs 125 are mounted to an adjusting rod 127 that can be moved inward and outward to adjust the compression of the biasing springs 125. The force of the biasing springs 125 is transferred to the upper drive rolls 107 via pivoting levers 129. As noted above, the vertically-aligned sets of drive rolls 107 have corresponding aligned annular or circumferential grooves through which the wending wires E1, E2 pass simultaneously. That is, the welding wires E1, E2 are located together in the grooves of an upper drive roll and a lower drive roll. The welding wires E1, E2 are squeezed or compressed within the grooves by the bias force applied by the biasing springs 125 to the drive rolls 107. As will be explained further below, the welding wires E1, E2 are made to contact each other within the grooves when squeezed by the drive rolls 107. In addition to an upward/downward compressive force applied to the welding wires E1, E2, a sideways compressive force is also applied to the welding wires E1, E2 to force them together inside of the grooves. The sideways compressive force is provided through the shape of the sidewalls of the grooves.

Further details regarding the structure of welding wire feeders can be found in U.S. Pat. No. 5,816,466 issued on Oct. 6, 1998 and U.S. Pat. No. 8,569,653 issued on Oct. 29, 2013, both of which are incorporated herein by reference.

Figure 4:
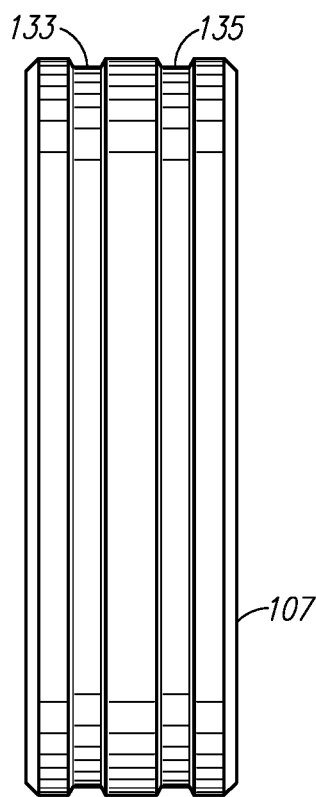
FIG. 4 illustrates an example drive roll.
Figure 5:
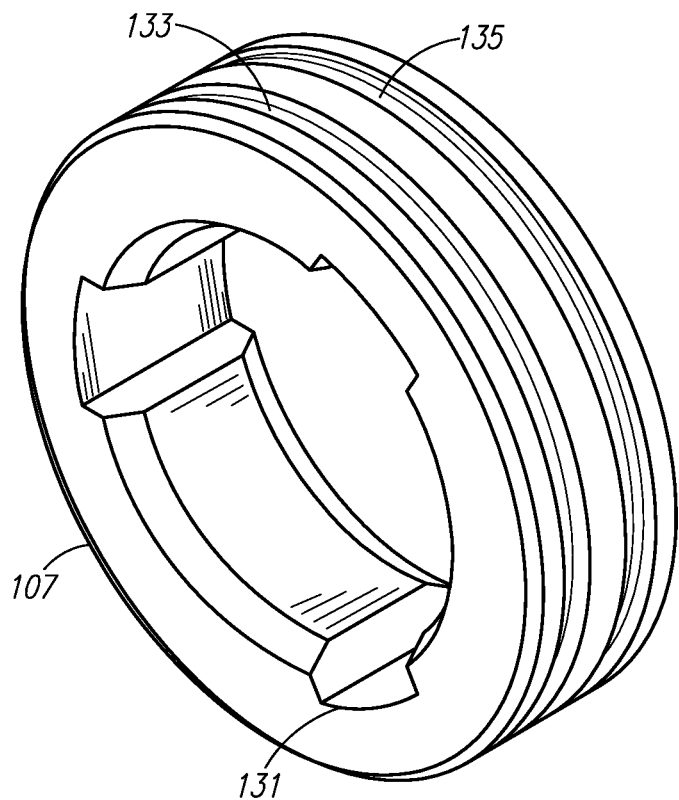
FIG. 5 is a perspective view of the example drive roll.

FIGS. 4 and 5 illustrate an example drive roll 107. The drive roll has a central bore. The inner surface of the bore can include contoured recesses 131 for receiving projections on a driving mechanism, such as a drive gear, to transfer drive torque to the drive roll 107. The drive roll 107 includes one or more annular or circumferential wire receiving grooves 133, 135. The wire receiving grooves 133, 135 are spaced axially along the circumference of the drive roll 107. The wire receiving grooves 133, 135 are designed to receive two welding wires. Example standard welding wire diameters for use with the drive rolls 107 include 0.030 inches, 0.035 inches, 0.040 inches, 0.045 inches, etc. The wire receiving grooves 133, 135 can have the same width and depth as each other, or have different widths and depths to accommodate different sizes or combinations of dual welding wires. If the wire receiving grooves 133, 135 each have the same width and depth, then the drive roll 107 can be reused when one groove is worn out by simply flipping the drive roll over and reinstalling it on the wire feeder. The wire receiving grooves 133, 135 can be configured to simultaneously drive two wires having the same diameter, or two wires having different diameters. In FIG. 4, the wire receiving grooves 133, 135 have a trapezoidal shape with straight, angled or inwardly-tapered sidewalls and a flat base extending between the sidewalls. However, the wire receiving grooves 133, 135 could have other shapes besides a trapezoidal shape, such as having a curved, concave groove base for example. In certain embodiments, the grooves 133, 135 can include knurling or other frictional surface treatments to help grip the welding wires.

Figure 6:
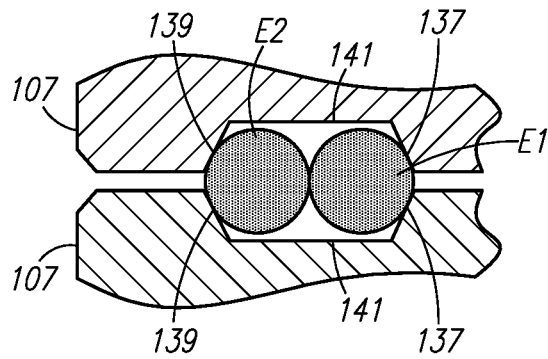
FIG. 6 illustrates a cross section of drives rolls feeding dual wires.

FIGS. 6 through 11 show partial cross sections of example drive rolls 107 as they would be mounted on a wire feeder for supplying dual welding wires. The drive rolls 107 are biased together to provide a clamping force on the first E1 and the second E2 welding wires. The welding wires E1, E2 are both located in the annular grooves of the upper and lower drive rolls 107. The annular grooves are aligned and can have a trapezoidal shape. In FIG. 6, the trapezoidal shape is an isosceles trapezoid formed by an inner sidewall 137, an outer sidewall 139, and a groove base 141 extending between the sidewalls. The isosceles trapezoidal shape is inverted as a cross-sectional recess from the outer circumferential surface of the drive rolls 107.

Due to the bias force applied to the drive rolls 107, the welding wires E1, E2 are clamped in the annular grooves between upper and lower sidewalls 137, 139 forming the grooves and the neighboring welding wire. The welding wires E1, E2 are stably held via three points of contact within the annular grooves. This clamping system can allow both wires to be fed through the wire feeder in a consistent manner. The two welding wires E1, E2 support each other during feeding and pull each other along via friction. Because the inner 137 and outer 139 sidewalls of the annular grooves are angled, they apply both vertical and horizontal clamping forces on the welding wires E1, E2. The horizontal clamping force pushes the welding wires E1, E2 together, causing them to contact each other. In certain embodiments, the welding wires E1, E2 are clamped within the annular grooves so as to be radially offset from both of the groove bases 141. That is, the welding wires E1, E2 are pinned between each other and the angled sidewalls 137, 139 of the grooves such that gaps exist between the welding wires and the groove bases 141. This can be seen clearly in FIG. 6.

Figure 7:
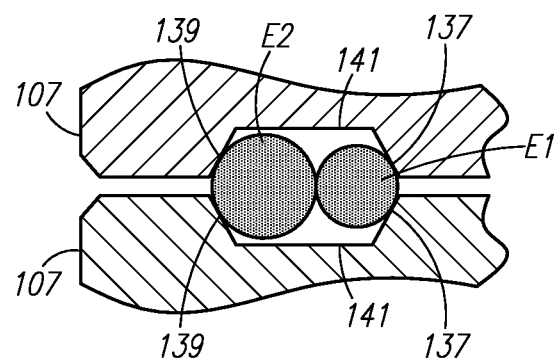
FIG. 7 illustrates a cross section of drives rolls feeding dual wires.

The clamping system discussed above allows for some variability (e.g., due to manufacturing tolerances) in the diameters of the welding wires E1, E2. If each welding wire E1, E2 had its own dedicated annular groove in the drive rolls 107, and one of the welding wires was slightly larger than the other, then the smaller welding wire might not be adequately clamped between the drive rolls. In such a situation, the larger welding wire would limit the radial displacement of the drive rolls 107 toward each other, thereby preventing proper clamping of the smaller wire. This could lead to feeding problems and so-called birdnesting of the smaller welding wire during feeding. The clamping system discussed above can accommodate wires of different sizes because the clamping system is self-adjusting. As can be seen in FIG. 7, when one welding wire E1 is larger than the other E2, the contact point between the wires is shifted axially from a central position within the annular grooves toward the smaller wire. Three points of contact are maintained on each welding wire E1, E2 by the sidewalls 137, 139 of the groove and the neighboring welding wire.

Figure 8:
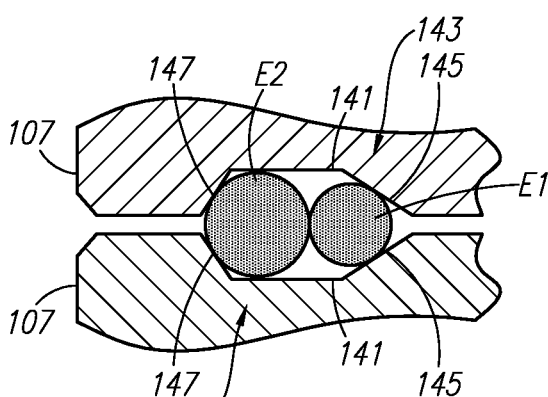
FIG. 8 illustrates a cross section of drives rolls feeding dual wires.
Figure 9:
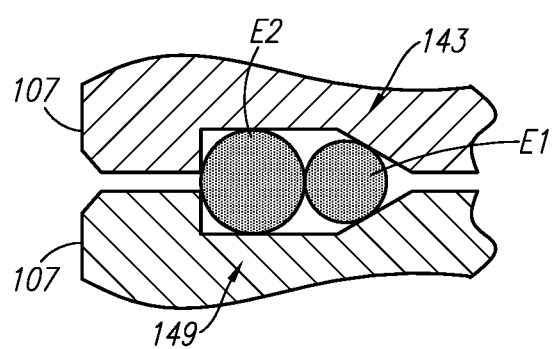
FIG. 9 illustrates a cross section of drives rolls feeding dual wires.
Figure 10:
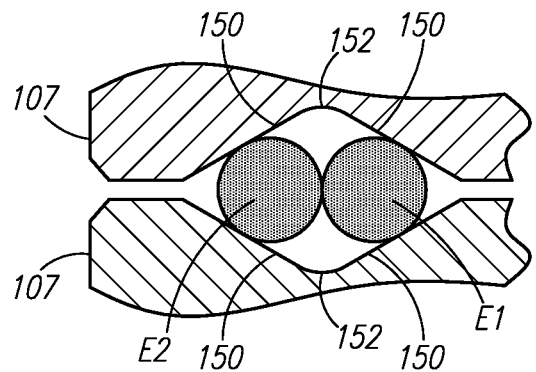
FIG. 10 illustrates a cross section of drives rolls feeding dual wires.

FIG. 8 shows drive rolls 107 having annular grooves 143 with cross sections having an acute trapezoid shape instead of an isosceles trapezoid. The inner 145 and outer 147 sidewalls of the grooves have different lengths and form different angles with the outer circumferential surface of the drive rolls. In FIG. 9, the drive rolls 107 have annular grooves 149 having a right trapezoid shape. Acute and right trapezoidal grooves can accommodate greater differences in welding wire diameters than isosceles trapezoids. Thus, acute and right trapezoidal grooves can be used when the groove is intended to drive welding wires having different diameters, such as a 0.040 inch welding wire with a 0.045 inch welding wire. In certain embodiments, the sidewalls and/or base of the grooves can be curved (e.g., concave or convex). Also, the inside corner transitions between the sidewalls and the base of the trapezoidal grooves can be curved or radiused. FIG. 10 shows example drive rolls having annular grooves with straight, angled sidewalls 150 joined by a concave curved or radiused groove base 152. In an example embodiment, the angle between the sidewalls 150 and the outer circumference of the drive roll 107 is about 150°, although other angles are possible and can be determined with sound engineering judgment.

Figure 11:
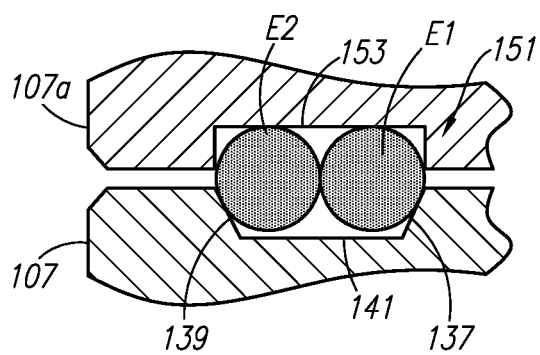
FIG. 11 illustrates a cross section of drives rolls feeding dual wires.

FIG. 11 shows an example embodiment in which one drive roll 107 has a trapezoidal groove for the welding wires E1, E2, and the other drive roll 107a has a non-trapezoidal groove. In FIG. 10, the non-trapezoidal groove is rectangular in shape, however other shapes are possible. For example, the non-trapezoidal groove could be curved, such as elliptical or rounded in shape. Further, the trapezoidal groove is shown as being located on the lower drive roll 107. However, the trapezoidal groove could be located on the upper drive roll 107a and the non-trapezoidal groove located on the lower drive roll. The welding wires E1, E2 are clamped between respective sidewalls 137, 139 of the trapezoidal groove and the base 153 of the non-trapezoidal groove 151, and the welding wires are forced into contact with each other as discussed above. Thus, the welding wires E1, E2 are stably held via three points of contact within the annular grooves 107, 107a.

Figure 12:
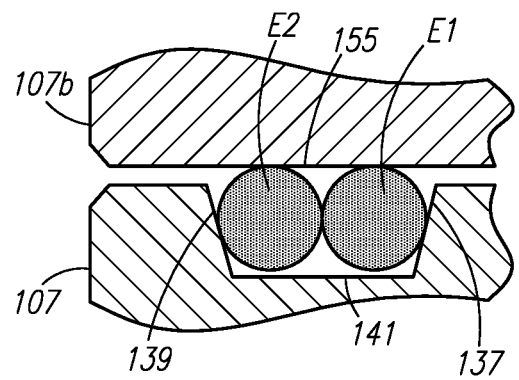
FIG. 12 illustrates a cross section of drives rolls feeding dual wires.

FIG. 12 shows an example embodiment in which one drive roll 107 has a trapezoidal groove for the welding wires E1, E2, and the other drive roll 107b has no groove, but rather directly contacts the welding wires on its outer circumferential surface 155. The trapezoidal groove is shown as being located on the lower drive roll 107. However, the trapezoidal groove could be located on the upper drive roll. The welding wires E1, E2 are clamped between respective sidewalls 137, 139 of the trapezoidal groove and the outer circumferential surface 155 of the upper drive roll 107b, and the welding wires are forced into contact with each other as discussed above. Thus, the welding wires E1, E2 are stably held via three points of contact.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A welding or additive manufacturing wire drive system, comprising:
   a first drive roll having a first annular groove;
   a second drive roll having a second annular groove aligned with the first annular groove;
   a first welding wire located between the first drive roll and the second drive roll in both of the first annular groove and the second annular groove;
   a second welding wire located between the first drive roll and the second drive roll in both of the first annular groove and the second annular groove; and
   a biasing member that biases the first drive roll toward the second drive roll to force the first welding wire to contact the second welding wire, wherein:
   the first welding wire contacts each of a first sidewall portion of the first annular groove, a first sidewall portion of the second annular groove, and the second welding wire, and the first welding wire is clamped against the second welding wire between the first drive roll and the second drive roll by the first sidewall portion of the first annular groove and the first sidewall portion of the second annular groove,
   the second welding wire contacts each of a second sidewall portion of the first annular groove, a second sidewall portion of the second annular groove, and the first welding wire, and the second welding wire is clamped against the first welding wire between the first drive roll and the second drive roll by the second sidewall portion of the first annular groove and the second sidewall portion of the second annular groove, and
   the first drive roll and the second drive roll rotate in opposite directions thereby moving the first welding wire and the second welding wire through the wire drive system.

2. The welding or additive manufacturing wire drive system of claim 1, wherein the first welding wire and the second welding wire have different diameters.

3. The welding or additive manufacturing wire drive system of claim 1, wherein the first welding wire and the second welding wire have different compositions.

4. The welding or additive manufacturing wire drive system of claim 1, wherein the first welding wire is a solid welding wire and the second welding wire is a flux-cored welding wire.

5. The welding or additive manufacturing wire drive system of claim 1, wherein the first welding wire is a solid welding wire and the second welding wire is a metal-cored welding wire.

6. The welding or additive manufacturing wire drive system of claim 1, wherein respective cross sections of the first annular groove and the second annular groove have a trapezoidal shape.

7. The welding or additive manufacturing wire drive system of claim 6, wherein the trapezoidal shape is an isosceles trapezoid.

8. The welding or additive manufacturing wire drive system of claim 6, wherein the trapezoidal shape is an acute trapezoid.

9. The welding or additive manufacturing wire drive system of claim 6, wherein the trapezoidal shape is a right trapezoid.

10. The welding or additive manufacturing wire drive system of claim 1, wherein:
    the first annular groove comprises a first groove base extending between the first sidewall portion of the first annular groove and the second sidewall portion of the first annular groove,
    the second annular groove comprises a second groove base extending between the first sidewall portion of the second annular groove and the second sidewall portion of the second annular groove,
    the first welding wire is offset from both of the first groove base and the second groove base, and
    the second welding wire is offset from both of the first groove base and the second groove base.

11. A welding or additive manufacturing wire drive system, comprising:
    a first drive roll having a first annular groove;
    a second drive roll having a second annular groove aligned with the first annular groove;
    a first welding wire located between the first drive roll and the second drive roll in both of the first annular groove and the second annular groove;
    a second welding wire located between the first drive roll and the second drive roll in both of the first annular groove and the second annular groove; and
    a biasing member that biases the first drive roll toward the second drive roll to force the first welding wire to contact the second welding wire, wherein:
    the first welding wire contacts each of a first sidewall portion of the first annular groove, a first sidewall portion of the second annular groove, and the second welding wire,
    the second welding wire contacts each of a second sidewall portion of the first annular groove, a second sidewall portion of the second annular groove, and the first welding wire, and
    the first drive roll and the second drive roll rotate in opposite directions thereby moving the first welding wire and the second welding wire through the wire drive system, wherein:
    the first annular groove comprises a first groove base extending between the first sidewall portion of the first annular groove and the second sidewall portion of the first annular groove,
    the second annular groove comprises a second groove base extending between the first sidewall portion of the second annular groove and the second sidewall portion of the second annular groove,
    the first welding wire is offset from both of the first groove base and the second groove base, and
    the second welding wire is offset from both of the first groove base and the second groove base, and wherein the first welding wire is clamped by the first sidewall portion of the first annular groove, the first sidewall portion of the second annular groove, and the second welding wire so as to be clamped offset from both of the first groove base and the second groove base, and
    the second welding wire is clamped by the second sidewall portion of the first annular groove, the second sidewall portion of the second annular groove, and the first welding wire so as to be clamped offset from both of the first groove base and the second groove base.

12. The welding or additive manufacturing wire drive system of claim 1, wherein:

the first annular groove comprises a first groove base extending between the first sidewall portion of the first annular groove and the second sidewall portion of the first annular groove, the second annular groove comprises a second groove base extending between the first sidewall portion of the second annular groove and the second sidewall portion of the second annular groove, and respective gaps exists between the first welding wire and both of the first groove base and the second groove base.

13. A welding or additive manufacturing wire drive system, comprising:

a first drive roll having a first circumferential groove comprising a first groove base extending between a first inner sidewall and a first outer sidewall of the first circumferential groove;

a second drive roll having a second circumferential groove aligned with the first circumferential groove, wherein the second circumferential groove comprises a second groove base extending between a second inner sidewall and a second outer sidewall of the second circumferential groove;

a first welding wire located between the first drive roll and the second drive roll in both of the first circumferential groove and the second circumferential groove;

a second welding wire located between the first drive roll and the second drive roll in both of the first circumferential groove and the second circumferential groove; and a biasing member that biases the first drive roll toward the second drive roll to force the first welding wire to contact the second welding wire, wherein:

the first welding wire contacts each of the first inner sidewall, the second inner sidewall, and the second welding wire, the second welding wire contacts each of the first outer sidewall, the second outer sidewall, and the first welding wire, the first welding wire is clamped by the first inner sidewall, the second inner sidewall, and the second welding wire so as to be clamped offset from both of the first groove base and the second groove base, and the second welding wire is clamped by the first outer sidewall, the second outer sidewall, and the first welding wire so as to be clamped offset from both of the first groove base and the second groove base.

14. The welding or additive manufacturing wire drive system of claim 13, wherein the first welding wire and the second welding wire have different diameters.

15. The welding or additive manufacturing wire drive system of claim 13, wherein the first welding wire and the second welding wire have different compositions.

16. The welding or additive manufacturing wire drive system of claim 13, wherein one of the first welding wire and the second welding wire is a solid welding wire and another one of the first welding wire and the second welding wire is a flux-cored welding wire.

17. The welding or additive manufacturing wire drive system of claim 13, wherein one of the first welding wire and the second welding wire is a solid welding wire and another one of the first welding wire and the second welding wire is a metal-cored welding wire.

18. The welding or additive manufacturing wire drive system of claim 13, wherein respective cross sections of the first circumferential groove and the second circumferential groove have a trapezoidal shape.

19. The welding or additive manufacturing wire drive system of claim 18, wherein the trapezoidal shape is an isosceles trapezoid.

20. The welding or additive manufacturing wire drive system of claim 18, wherein the trapezoidal shape is an acute trapezoid.

21. The welding or additive manufacturing wire drive system of claim 18, wherein the trapezoidal shape is a right trapezoid.

22. A welding or additive manufacturing wire drive system, comprising:

a first drive roll;

a second drive roll, wherein one or both of the first drive roll and the second drive roll has a circumferential groove;

a first welding wire located between the first drive roll and the second drive roll in the circumferential groove;

a second welding wire located between the first drive roll and the second drive roll in the circumferential groove; and a biasing member that biases the first drive roll toward the second drive roll to force the first welding wire to contact the second welding wire, wherein the first welding wire further contacts a first sidewall portion of the circumferential groove, and the second welding wire further contacts a second sidewall portion of the circumferential groove, wherein both of the first welding wire and the second welding wire are offset from a base portion of the circumferential groove, said base portion extending between the first sidewall portion and the second sidewall portion of the circumferential groove, and the first welding wire is clamped by the first sidewall portion of the circumferential groove against the second welding wire so as to be clamped offset from the base portion, and the second welding wire is clamped by the second sidewall portion of the circumferential groove against the first welding wire so as to be clamped offset from the base portion.

23. The welding or additive manufacturing wire drive system of claim 22, wherein the circumferential groove has a trapezoidal shape.

24. The welding or additive manufacturing wire drive system of claim 22, wherein the first welding wire and the second welding wire have different diameters.

25. The welding or additive manufacturing wire drive system of claim 22, wherein both of the first drive roll and the second drive roll include respective vertically-aligned circumferential grooves.

26. The welding or additive manufacturing wire drive system of claim 22, wherein the base portion of the circumferential groove is concave.

* * * * *